Dec. 15, 1970    C. J. BRAGG ET AL    3,547,707
TEMPERATURE MONITORING APPARATUS
Filed Dec. 11, 1967    2 Sheets-Sheet 1

INVENTORS.
CALVIN J. BRAGG
JOSEPH C. CROWTHER, JR.

BY McLean, Morton & Boustead

ATTORNEYS.

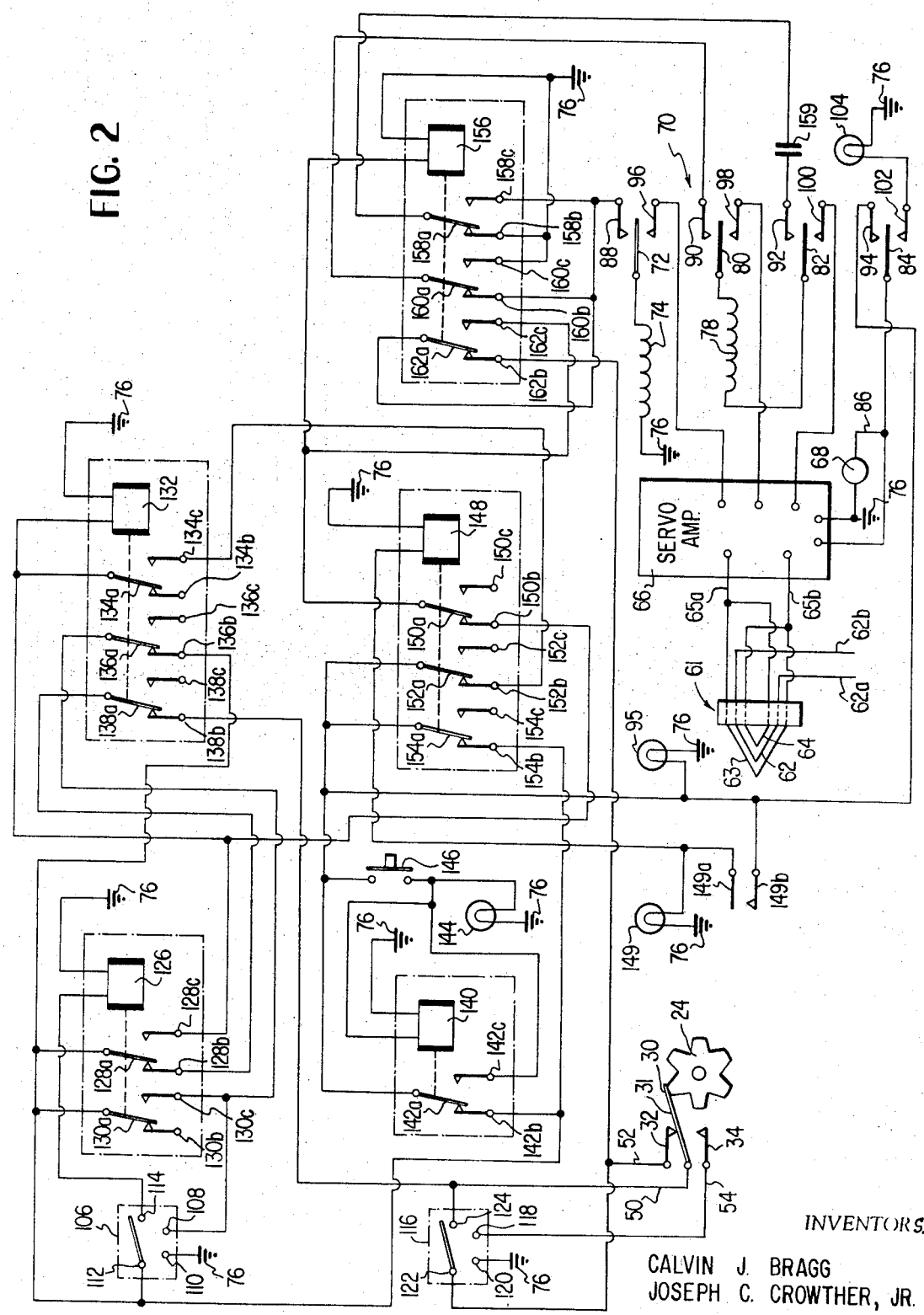

United States Patent Office 3,547,707
Patented Dec. 15, 1970

3,547,707
TEMPERATURE MONITORING APPARATUS
Calvin J. Bragg, Chicago, and Joseph C. Crowther, Jr., Flossmoor, Ill., assignors to Sinclair Research, Inc., New York, N.Y., a corporation of Delaware
Filed Dec. 11, 1967, Ser. No. 689,661
Int. Cl. H01v 1/00
U.S. Cl. 136—224
8 Claims

ABSTRACT OF THE DISCLOSURE

A temperature monitoring apparatus capable in a first mode of providing a step profile of the temperature within a vessel and capable in a second mode of following and monitoring the peak temperature within the vessel. In the first mode a reversible motor withdraws a flexible thermocouple sheath from a thermowell on the side of the vessel and coils the sheath on a take-up drum. Three colinear equally spaced thermocouples are within the sheath. Timed switching intermittently stops the motor to allow the thermocouples to reach thermal equilibrium before a temperature reading is taken from the center thermocouple. When the sheath has reached the end of the thermowell, the motor reverses to return the sheath fully into the thermowell without stopping. In the second mode the two most remote thermocouples are connected in parallel opposition to an automatic control system which causes the motor to drive the thermocouples toward the higher temperature location so that, when equilibrium is reached, the remote thermocouples straddle a temperature peak which is monitored by the center thermocouple.

---

This invention pertains to an automatic temperature monitoring device. More particularly, this invention pertains to a device for measuring the temperature in a vessel such as a fixed bed catalytic reactor during operations such as the operation of the reactor and regeneration of the catalyst. The device is capable of operation in a first mode in which it develops a temperature profile of the vessel and in a second mode in which it detects and follows peak temperature points. The first mode of operation is particularly well suited for monitoring the temperature profile within a reactor during operation of the reactor. The second mode of operation is suited for following the burn zone and monitoring the burn zone temperature during catalyst regeneration.

A fixed bed catalytic reactor is operated with a specified temperature profile along its length. Optimum operation of the reactor requires that the temperature profile be accurately known to avoid temperature overshoot upon startup and to detect hot or cold spots which would otherwise adversely affect the quality of the finished product.

A temperature profile can be obtained by placing a number of temperature monitoring devices, such as thermocouples within a thermowell along the reactor. When the temperature at each monitoring point is at the desired level, it is assumed that the temperature between monitoring points is also at the desired level and that the proper temperature profile has been attained. However, frequently hot or cold spots exist between the thermocouples and remain undetected. Although use of a larger number of thermocouples within the thermowell increases the accuracy of the temperature profile, the thermowell is of necessity small, and so only a limited number of thermocouples may be placed within it. Another way of obtaining a temperature profile is to continuously move one thermocouple through the thermowell to obtain a continuous profile. However, a thermocouple has thermal mass, and time is required for its output to indicate the actual temperature at the monitored point. Consequently, the output of a continuously moving thermocouple lags behind the actual temperature profile.

An accurate temperature profile can be obtained by moving a thermocouple short distance within the thermowell, and stopping the thermocouple at each monitoring spot for sufficient time to allow it to reach thermal equilibrium before moving it to the next monitoring spot. Such a stop and go procedure results in a step temperature profile. Such an automatically operated step profile apparatus must be of small size to permit its use within the limited space available; and yet the thermocouple must reach over the entire length of the catalytic reactor. Thus, the thermocouple and its leads must be at least as long as the reactor. Use of a rigid thermocouple in such an operation requires that there be sufficient space outside the reactor to accommodate the thermocouple when it is substantially fully retracted from the reactor to monitor the temperature at the near end of the reactor. It is accordingly impractical to use a rigid thermocouple in such a step profile apparatus.

When a catalytic reactor is operated, coke is slowly deposited on the catalyst. Ultimately the coke deposit reaches such a level that it prevents the desired operation of the reactor. The catalyst is then regenerated by burning the coke from it. Regeneration is commonly performed by passing a heated oxygen-bearing gas stream through the catalyst. As the coke burns from the catalyst, the burning zone proceeds downward until all the coke has been removed. The burn zone is the hottest point within the catalyst. The temperature of the burn zone must be closely controlled because operation at too low a temperature may result in not burning off all of the coke, while operation at too high a temperature may result in damaging or destroying the catalyst. The burn zone temperature can be controlled by controlling the amount of oxygen within the gas stream that is passed through the catalyst.

Proper control of the regeneration process requires that the burn zone be followed as it passes through the catalyst and that the temperature of the burn zone be monitored. Since there is a temperature peak within the burn zone during the regeneration process, the burn zone is a point of zero temperature gradient. Thus, a zero gradient-following temperature monitor can be utilized as an input device to control the oxygen content of the gas within the catalyst regeneration control system.

In one aspect, the present invention is a temperature monitoring system utilizing a semi-rigid thermocouple which is moved within a thermowell by a drive wheel and which is wound on a take-up drum as it is detracted from the thermowell. A control system causes the thermocouple to pause intermittently as it is moved for sufficient time to allow it to reach thermal equilibrium.

In another aspect, the monitoring thermocouple of the present invention is straddled by two additional thermocouples which are connected in parallel with opposing polarities, to provide an output indicative of the difference in temperature at their two locations. This output is applied to a servomechanism system which drives the thermocouples toward the higher temperature. Thus, when the temperatures at the two straddling thermocouples are equal, they are straddling a point of zero temperature gradient. A potentiometer arm is positioned according to the monitor location to provide an indication of that location. The center thermocouple monitors the temperature at the burn zone and provides an input to the control system which controls the percentage of oxygen in the gas stream passing over the catalyst. An additional thermocouple can be utilized to provide a visual indication of the burn zone temperature, if desired.

A further aspect of the present invention includes circuitry to permit selection of the operation of the apparatus in either the temperature profile monitoring mode or in the temperature peak-following mode. Thus, a versatile apparatus is provided which is capable of performing both of these essential functions with a minimum of equipment.

These and other aspects and advantages of the present invention are apparent in the following detailed description and claims, particularly when read in conjunction with the accompanying drawings, in which like parts bear like reference numerals.

In the drawing:

FIG. 2 is a schematic representation of the control circuitry utilized in the present invention.

Figure 1:
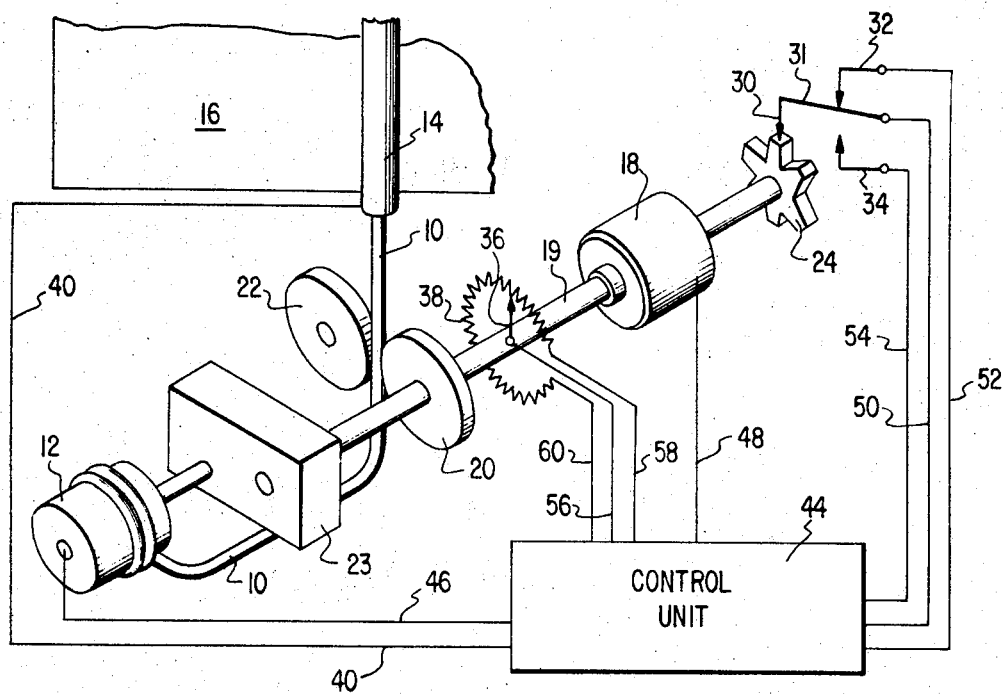
FIG. 1 is a diagram, partially in block form and partially in perspective, depicting the temperature monitoring system of the present invention.

Referring now to FIG. 1, the apparatus of a preferred embodiment of the present invention includes a semi-rigid thermocouple sheath 10, which houses the necessary thermocouples. Sheath 10 is wound about a take-up drum 12 and inserted into a thermowell 14 upon one wall of fixed bed catalytic reactor 16. Within thermocouple sheath 10, there is contained a temperature monitoring thermocouple connected to circuitry (not shown) which controls the oxygen content of the gas that passes over the catalyst during the regeneration process. An additional thermocouple is located on each side of this temperature monitoring thermocouple. These two thermocouples which straddle the temperature monitoring thermocouple provide inputs to the control system of the present invention. A fourth thermocouple can be located within sheath 10 to provide temperature readings to a temperature indicator; but this temperature indication could be obtained from the temperature monitoring thermocouple, if desired.

A reversible motor 18 turns shaft 19 upon which is mounted a drive wheel 20. Idler wheel 22 is mounted next to drive wheel 20 with its shaft (not shown) parallel to shaft 19. Gearing within gear box 23 couples shaft 19 to take-up drum 12 to cause drum 12 to turn. Thermocouple sheath 10 is held between drive wheel 20 and idler wheel 22 in such a manner that sheath 10 is paid out from drum 12 or drawn back onto drum 12 as drive wheel 20 and drum 12 rotate. Thermocouple sheath 10 is sufficiently rigid that it will not bend under its own weight, and so as sheath 10 is paid out it rises within thermowell 14.

A multi-lobe cam 24 is mounted upon shaft 19. When cam switch 30 is on a lobe of cam 24, the moving contact 31 of cam switch 30 closes against fixed contact 32. When cam switch 30 is between lobes of cam 24, moving contact 31 closes against fixed contact 34.

Armature 36 of multi-turn potentiometer 38 is mounted upon shaft 19 so that the position of armature 36 on the resistance of potentiometer 38 indicates the length of thermocouple sheath 10 which has been paid out from drum 12 into thermowell 14. A limit switch (not shown) within thermowell 14 is closed when thermocouple sheath 10 is fully extended within thermowell 14. This limit switch is connected to control unit 44 by leads represented in FIG. 1 by cable 40. Since the thermocouples are at the end of sheath 10, the output of potentiometer armature 36 indicates the position of the thermocouples, and the limit switch within thermowell 14 is actuated when the thermocouples are fully within thermowell 14.

Control unit 44 houses the circuitry for controlling the temperature monitoring operation and is depicted in detail in FIG. 2. The straddling thermocouples within sheath 10 are connected to control unit 44 by leads depicted in FIG. 1 by cable 46 between control unit 44 and take-up drum 12. Reversible motor 18 is tied to control unit 44 by four lines, depicted in FIG. 1 as cable 48. The direction of rotation of motor 18 is determined by the energization state of the four lines within cable 48, as is explained more fully hereinafter. Cam switch 30 has its moving contact 31 and its fixed contacts 32 and 34 tied to control unit 44 by lines 50, 52 and 54 respectively. Armature 36 of potentiometer 38 is tied to control unit 44 by line 56. The two ends of the fix resistance of potentiometer 38 are connected to control unit 44 by lines 58 and 60.

FIG. 2 depicts in schematic form the detailed circuitry within control unit 44. The thermocouples within sheath 10 are depicted generally at reference numeral 61. When the apparatus is used to obtain a temperature profile, temperature monitoring thermocouple 62 is connected by leads 62a and 62b to the temperature monitoring equipment (not shown). When the apparatus is used to control the catalyst regeneration, temperature monitoring thermocouple 62 is connected by lines 62a and 62b to the gas flow control circuitry (not shown).

Thermocouples 63 and 64 are on either side of thermocouple 62 and are connected in parallel with opposing polarities so that their output voltage represents the difference in temperature between their two locations which straddle the temperature monitoring point at which thermocouple 62 is located. The magnitude of the output voltage from the opposing thermocouples 63 and 64 indicates the magnitude of the temperature difference between their two locations, and the output voltage polarity indicates which thermocouple, 63 or 64, is at the higher temperature location.

This output voltage from the straddling thermocouples 63 and 64 is applied by leads 65a and 65b to the signal input of servo amplifier 66. The power terminals of servo amplifier 66 are coupled across the two terminals of voltage source 68. Four-pole-double-throw-center-off switch 70 has its first movable contact 72 tied to one side of coil 74 of reversible motor 18. The other side of coil 74 is tied to common point 76 from voltage source 68. The second coil 78 of reversible motor 18 is connected between moving contacts 80 and 82 of switch 70. Moving contact 84 of switch 70 is tied to power lead 86 from voltage source 68.

When switch 70 is thrown to its first position (up in FIG. 2), moving contacts 72, 80, 82, and 84 close against fixed contacts 88, 90, 92, and 94, respectively, and the control system operates in the temperature profile monitoring mode. Indicator 95 is coupled between fixed contact 94 and common point 76 and is energized during the temperature profile monitoring mode. When switch 70 is thrown to its second position (down in FIG. 2), moving contacts 72, 80, 82, and 84 close against contacts 96, 98, 100, and 102, respectively, and the control system operates in the temperature peak-following mode. Fixed contacts 96, 98, and 100 of switch 70 are connected to the three control output terminals of servo amplifier 66. Indicator 104 is coupled between fixed contact 102 and common point 76 and is energized during the temperature peak-following mode. When switch 70 is in its center position, no contacts are closed, and the control system is inoperative in a stand-by mode.

During the temperature profile monitoring mode of operation, reversible motor 18 is controlled by a plurality of relays and time-delay switches within control unit 44. When time delay switch 106 receives power at its power terminals 108 and 110, it times a preset delay and then operates to provide a current path between its first terminal 112 and its second terminal 114. By way of example, time-delay switch 106 might comprise a motor driven cam with a cam switch riding thereon. Similarly, time-delay switch 116 receives power at its power terminals 118 and 120 and times a preset delay before operating to provide a current path between its first terminal 122 and its second terminal 124. Switch 116 is preferably a thermal switch, although alternatively it might be an electromagnetic or solid state delay relay.

Terminal 114 of switch 106 is connected to one terminal of relay coil 126, which has its other terminal tied to common point 76. Moving contact 128a is operated by relay coil 126 between normally closed contact 128b and normally open contact 128c. Likewise, moving contact 130a is operated by relay coil 126 between normally closed contact 130b and normally open contact 130c.

Contact 128c is connected to the first terminal of relay coil 132 which has its second terminal tied to common point 76. When relay coil 132 is energized, moving contacts 134a, 136a, and 138a operate between normally closed contacts 134b, 136b, and 138b, respectively, and normally open contacts 134c, 136c, and 138c, respectively. Moving contact 134a is tied to the first side of relay coil 132. Moving contact 136a is connected to relay contact 130c and to terminal 108 of switch 106. Contact 138a is tied to relay contact 128b. Terminal 110 of switch 106 is connected to common point 76.

Relay coil 140 operates moving contact 142a between normally closed contact 142b and normally open contact 142c. The first terminal of relay coil 140 is tied to its normally open contact 142c. The second terminal of coil 140 is tied to common point 76. Contact 142b is connected to terminal 112 of switch 106. Contact 142b is also connected to moving contacts 128a and 130a of relay coil 126 and to contact 136b of relay coil 132. Indicator 144 is coupled between normally open contact 142c and common point 76. Normally open push-button 146 has its first terminal tied to moving contact 142a and its second terminal tied to normally open contact 142c so that, when pushbutton 146 is depressed, it provides a path by-passing the normally open contact.

Relay coil 148 has its first terminal tied to one terminal of indicator 149 and to contact 149a of the limit switch at the upper end of thermowell 14. The second terminal of coil 148 is tied to common point 76. Switch contact 149b of the limit switch is connected to moving contact 142a. Thus, when thermocouple sheath 10 is fully extended within thermowell 14, the limit switch operates to close moving contact 149a against contact 149b. The second terminal of indicator 149 is tied to common point 76.

When relay coil 148 is energized, moving contacts 150a, 152a, and 154a operate between normally closed contacts 150b, 152b, and 154b, respectively, and normally open contacts 150c, 152c, and 154c, respectively. Moving contacts 152a and 154a are tied together and are connected to moving contact 142a. Normally closed contact 154b is connected to relay contact 142b. Normally closed contact 152b is connected to relay contact 134c. Normally closed contact 150b is connected to relay contact 128c. There are no connections to normally open contacts 150c, 152c, and 154c.

Moving contact 150a is tied to the first side of relay coil 156 which has its second side tied to common point 76. Moving contacts 158a, 160a, and 162a are operated by relay coil 156 between normally closed contacts 158b, 160b, and 162b, respectively, and normally open contacts 158c, 160c, and 162c, respectively. Moving contact 158a is coupled through capacitor 159 to switch contact 92. Contacts 160a and 162a are tied, respectively to contacts 90 and 88 of switch 70. In addition, contact 162a is tied to relay contacts 160b and 158c. Contacts 158b and 160c are tied to common point 76. Normally open contact 162c is connected to the contact 150a.

Moving contact 31 of cam switch 30 is connected via line 50 to terminal 124 of time delay switch 116 and is connected to relay contact 138b. Cam switch contact 32 is connected by line 52 to terminal 122 of switch 116 and to relay contact 162b. Cam switch contact 34 is connected by line 54 to the power terminal 118 of time delay switch 116. Power terminal 120 of switch 116 is tied to common point 76.

Figure 3:
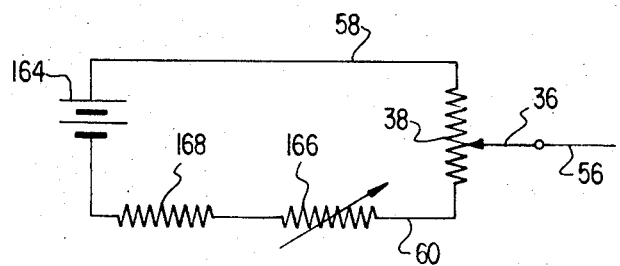
FIG. 3 is a schematic representation of the thermocouple position-monitoring circuit utilized in the present invention.

FIG. 3 depicts in schematic form the circuitry utilized to monitor the distance that thermocouple sheath 10 is inserted within thermowell 14. Potentiometer 38 has its armature 36 tied to shaft 19 of motor 18 so that the position of armature 36 on the resistance of potentiometer 38 is indicative of the distance that sheath 10 extends into thermowell 14. The first side of potentiometer 38 is connected by line 58 to one terminal of voltage source 164. The other side of potentiometer 38 is connected by line 60 to one end of variable resistor 166. The other side of resistor 166 is coupled by fixed resistor 168 to the second terminal of voltage source 164. Fixed resistor 168 and variable resistor 166 control the range of this monitoring circuit. The voltage on armature 36 is, thus, indicative of the length of thermocouple sheath 10 within thermowell 14. This voltage is applied by line 56 to indicating equipment (not shown).

When the temperature monitoring system of the present invention is to be utilized to obtain the temperature profile of a fixed bed catalytic reactor, four-pole-double-throw switch 70 is placed in its first position (up in FIG. 2). Operation commences with thermocouple sheath 10 extended into the thermowell 14 to a point just below the limit switch, so that contact 149a is not closed against contact 149b. Cam switch 30 is upon a lobe of cam 24, closing contact 31 against contact 32. Temperature readings are then taken as thermocouple sheath 10 is withdrawn.

Voltage from voltage source 68 passes through switch contacts 84 and 94 to energize indicator 95 to show that a temperature profile is to be obtained. A current path exists from voltage source 68 through switch contacts 84 and 94, relay contacts 142a and 142b, relay contacts 128a and 128b, relay contacts 138a and 138b, cam switch contacts 31 and 32, relay contacts 162b and 162a, and switch contacts 88 and 72 to the first coil 74 of reversible motor 18 and then to common point 76. In addition, this current path is tied from relay contact 162a through relay contacts 160b and 160a and switch contacts 90 and 80 to the second coil 78 of reversible motor 18 and then through switch contacts 82 and 92 and relay contacts 158a and 158b to common point 76.

So long as cam switch 30 is upon the lobe of cam 24, motor 18 operates to withdraw thermocouple sheath 10 from thermowell 14. When cam 24 has rotated so that cam switch 30 is no longer upon a lobe of cam 24, contact 31 moves away from contact 32 and closes against contact 34. This interrupts the current path to coils 74 and 78 and applies current to time delay switch 116.

As a consequence, motor 18 stops, and thermocouple sheath 10 remains stationary so that the temperature monitoring thermocouple 62 can reach thermal equilibrium. Time delay switch 116 is selected so that the length of time required for switch 116 to operate to close a path between terminals 122 and 124 is substantially the same as the time required for thermocouple 62 to reach thermal equilibrium. The current path between contacts 122 and 124 by-passes cam switch contacts 31 and 32 and again applies current to the coils 74 and 78 of motor 18. As a consequence, motor 18 again commences to retract thermocouple sheath 10 from thermowell 14, and cam 24 again rotates. When cam switch 30 moves onto the next lobe of cam 24, contact 31 moves away from contact 34 and closes against contact 32, removing power from switch 116 which then resets itself.

There remains a current path to coils 74 and 78 through cam switch contacts 31 and 32. Motor 18 continues to drive until cam switch 30 is no longer upon this second lobe of cam 24. Contact 31 then moves away from contact 32 and closes against contact 34. This again stops the operation of motor 18 and energizes time delay switch 116. Thus, the motor alternately stops and goes, alternately moving and halting the retraction of thermocouple sheath 10 from thermowell 14. Each time the retraction is stopped, the temperature monitoring thermocouple 62 within thermocouple sheath 10 reaches thermal equilibrium, and a temperature reading is taken via lines 62a and 62b to be used in the temperature profile.

During this time power is also applied to cam switch 106 by the path from relay contact 142b through relay contacts 136b and 136a. Cam switch 106 rotates at a rate which causes it to close a current path between its terminals 112 and 114 after a time sufficient to permit thermocouple sheath 10 to be moved the entire length of thermowell 14. This time duration depends, of course, upon the length of thermowell 14. When switch 106 operates, a current path exists from relay contact 142b through switch contacts 112 and 114 to relay coil 126. When current flows to relay coil 126, contacts 128a and 130a close against contacts 128c and 130c, respectively. The current path through contacts 130a and 130c continues to provide power to switch 106. The current path through contacts 128a and 128c energizes relay coil 132. In addition, there is a current path from contact 128c through relay contacts 150b and 150a to energize relay coil 156.

When relay coil 132 is energized, contact 138a moves away from contact 138b. Consequently, the current path from these contacts to motor coils 74 and 78 (by way of time delay switch 116 and cam switch 30) is interrupted. Motor 18, therefore, stops running.

When relay coil 156 is energized, its moving contacts operate to reverse the direction of rotation of motor 18 to reinsert thermocouple sheath 10 into thermowell 14. Thus, contacts 158a and 160a close against contacts 158c, 160c, respectively. This reverses the phase of current flow through coil 78 of motor 18. Capacitor 159 causes the current through coil 78 to be 90° out of phase from the current through coil 74, and the direction of that phase difference depends upon the state of relay 156. The current path from relay contact 150a also passes current through relay contacts 162c and 162a and switch contacts 88 and 72 to energize coil 74 of motor 18. Current passes from contact 162a through relay contacts 158c and 158a and switch contacts 92 and 82 to coil 78. From coil 78 this current then passes through switch contacts 80 and 90 to relay contacts 160a and 160c to common point 76. Since the phase of the current flowing through coil 78 is reversed from the phase of the previous current, motor 18 rotates in the opposite direction, unwinding thermocouple sheath 10 from take-up drum 12 and returning the sheath into thermowell 14. Since relay 156 remains activated, the return of sheath 10 into thermowell 14 is continuous, rather than in steps.

When sheath 10 is fully returned into thermowell 14, the rotation of motor 18 is stopped by one of two circuit paths. The path utilized depends upon whether or not the limit switch at the end of thermowell 14 is actuated by sheath 10 before cam switch 106 has rotated to lift its armature, breaking the current path between its terminals 112 and 114.

If the limit switch operates before cam switch 106 has finished rotating, then when the limit switch contacts 149a and 149b close, current passes from the voltage source 68 through switch contacts 84 and 94, through switch contacts 149b and 149a to energize relay coil 148, and to energize indicator 149. As a consequence, armature 150a moves away from contact 150b, and relay coil 156 is no longer energized. In addition, the current path to the coils 74 and 78 is broken. Consequently, the motor 12 stops running. Cam 24 is adjusted so that, when thermocouple sheath 10 actuates limit switch contacts 149a and 149b to stop motor 18, cam switch 30 is upon a lobe of cam 24.

Cam switch 106 continues to rotate until its contacts open, breaking the current path between its terminals 112 and 114. When this current path is no longer provided, relay coil 126 is de-energized, and its moving contacts 128a and 130a return to their normally closed contacts 128b and 130b, respectively. Consequently, the current path through contacts 128a and 128c is broken, and so relay coil 132 is de-energized. Current then passes from voltage source 68 to motor coils 74 and 78 via the original path. This path is from source 68, through switch contacts 84 and 94, relay contacts 142a and 142b, relay contacts 128a and 128b, relay contacts 138a and 138b, cam switch contacts 31 and 32, relay contacts 162b and 162a, and switch contacts 88 and 72 to coil 74 of motor 18. From armature 162a the current also passes through relay contacts 160b and 160a and switch contacts 90 and 80 to the second coil 78 of motor 18. The return path from motor 18 is through switch contacts 82 and 92 and relay contacts 158a and 158b to common line 76. The thermocouple sheath 10 then is retracted until the limit switch opens, moving armature 149a away from contact 149b, and breaking the current path to relay coil 148 to cause coil 148 and indicator 149 to de-energize. The control system is thus back to its initial condition, and a second temperature profile can be obtained.

Alternatively, if cam switch 106 operates to open the path between its terminals 112 and 114 before the limit switch within thermowell 14 closes contact 149a against contact 149b, the motor 18 continues to run to insert thermocouple sheath 10 fully within thermowell 14. The return of thermocouple sheath 10 into the thermowell 14 commences when switch 106 operates to provide a current path between its terminals 112 and 114 to energize relay 126. This closes contact 128a against contact 128c to energize relay coil 132 and to provide a current path through relay contacts 150b and 150a to relay contact 162c and 162a from which the current flows through the motor coils 74 and 78. When cam switch 106 operates to open the current path between its terminals 112 and 114, relay coil 126 is de-energized. However, a current path still exists to relay contacts 162c and 162a. This current path is from current source 68 through line 86, switch contacts 84 and 94, relay contacts 152a and 152b, relay contacts 134c and 134a, relay contacts 150b and 150a, to relay coil 156 and to relay contacts 162c and 162a from which current passes to the motor coils 74 and 78, as described above. Thus, the current path continues to exist until thermocouple sheath 10 reaches the limit switch within thermowell 14 to close armature 149a against contact 149b. This contact closure energizes relay coil 148 and opens the current path. Consequently, current is no longer provided to motor coil 74 and 78 and to relay coil 156 is de-energized. The motor then reverses direction and withdraws thermocouple sheath 10, as described previously, until thermocouple sheath 10 moves away from the limit switch, releasing contact 149a from closure against contact 149b. Then another temperature profile is commenced. Thus, the limit switch and its armature 149a and contact 149b insure that the temperature profile commences at the same point within thermowell 14 each time a profile is run.

When it is desired to stop the temperature profile operation at the end of a profile run, pushbutton 146 is depressed to energize relay coil 140. Contact 142a then closes against contact 142c to maintain a current path to coil 140 after pushbutton 146 is released. Indicator 144 is also energized to indicate that the profile operation is to terminate at the end of the present run. The current path to motor coils 74 and 78 is not interrupted since relay contacts 154a and 154b are closed. When the profile run is completed and thermocouple sheath 10 is reinserted into thermowell 14, it actuates the limit switch to close armature 149a against contact 149b. This energizes relay coil 148, and contact 154a opens from contact 154b. Therefore, the current path to motor coils 74 and 78 is broken and the motor stops. The system remains in this condition until switch 70 is moved out of its temperature profile monitoring position.

When the catalyst within fixed bed catalystic reactor 16 requires regeneration, an oxygen bearing gas is passed over it to burn off the coke from the surface of the catalyst. To monitor the burn zone temperature, switch 70 is placed in its second position (down in FIG. 2). Current from source 68 passes through switch contacts 84 and 102 to energize indicator 104. Motor coil 74 is coupled via switch contacts 72 and 96 to the first control output terminal of servo amplifier 66. Motor coil 78 is coupled across the other two control output terminals of servo amplifier 76 by way of switch contacts 82, 100, 80, and 98.

When a temperature gradient is present within thermowell 12, the two straddling thermocouples 63 and 64 are at different temperatures, and, therefore, they produce an output voltage which is applied to servo amplifier 66. This voltage varies in magnitude and in polarity according to the difference in temperature at the location of the two thermocouples 63 and 64. Servo amplifier 66 amplifies this voltage difference and applies it to motor coils 74 and 78 to drive motor 18 in a direction that moves thermocouple 10 toward the higher of the two temperatures.

When thermocouples 63 and 64 are at equal temperatures, there is no input to servo amplifier 66 and so no driving current is applied to motor coils 74 and 78. These equal temperatures indicate that thermocouples 63 and 64 are on either side of a point of zero temperature gradient. Thus, the temperature measuring thermocouple 62, located between the thermocouples 63 and 64, is measuring the temperature at this zero gradient. This is a temperature peak.

If thermocouples 63 and 64 are on either side of a temperature minimum rather than a temperature maximum, then when a temperature differential exists, motor 18 drives the thermocouples towards the higher temperature. This causes the thermocouples to move away from the temperature minimum. Thus, when equilibrium is reached, thermocouples 63 and 64 must straddle a temperature maximum. If it is desired to follow and to monitor a temperature minimum in some operation, then the input leads from the thermocouples 63 and 64 to servo amplifier 66 are reversed.

The temperature monitoring thermocouple 62 measures the temperature at the burn zone. This temperature measurement signal is applied via lines 62a and 62b to the system which controls the oxygen content of the gas passing over the catalyst. Thus, the burning zone temperature is controlled.

Due to several common components utilized in the temperature profile monitoring mode and in the temperature peak-following mode, it is advantageous to utilize a common set of circuitry, as depicted in FIG. 2. This permits the use of a single thermocouple sheath and a single drive motor. The measurement, thus, can be made at the same point on the reactor. While the above description of the preferred embodiment of the present invention has disclosed the use of particular components, obviously numerous modifications and changes can be made and still be within the scope of the invention. In particular, although the description has included the use of electromechanical devices such as electrically operated cam switches and relays, obviously solid state timing and switching devices could be used in place of these. Thus, these illustrative descriptions are not limiting but are merely representative of the scope of the invention.

What is claimed is:

1. Temperature measuring apparatus comprising:
   an elongated flexible thermocouple sheath;
   at least one thermocouple within said sheath;
   a thermowell for receiving said sheath;
   motor drive means coupled to said sheath outside said thermowell and including a reversible motor for operation in a first direction in which said sheath is retracted from said thermowell and in a second direction in which said sheath is inserted into said thermowell;
   sheath storage means for coilably holding said sheath upon removal of said sheath from said thermowell;
   input power means; and
   switching means coupling said input power means to said motor drive means for alternatively energizing and de-energizing said motor drive means and including first control means comprising:
      (a) means actuated upon operation of said reversible motor in said first direction to intermittently interrupt operation of said motor drive means for a preset time;
      (b) timing means for timing operation of said reversible motor in said first direction;
      (c) means responsive to said timing means for reversing the direction of operation of said reversible motor from said first direction to said second direction;
      (d) means for generating a signal upon insertion of said sheath fully into said thermowell; and
      (e) means responsive to said signal for reversing the direction of operation of said reversible motor from said second direction to said first direction.

2. Apparatus as claimed in claim 1 in which said responsive means includes means for actuating said reversible motor to return said sheath to a fixed insertion distance within said thermowell following generation of said signal.

3. Apparatus as claimed in claim 1 having first, second and third thermocouples within said sheath, said thermocouples being colinear and substantially equally spaced apart, each of said thermocouples producing a voltage indicative of the temperature at its location;
   said apparatus further including means connecting the two most remote of said thermocouples in voltage opposition to produce a difference voltage indicative of the temperature difference between said two remote thermocouples locations;
   said switching means further including:
      (a) a first switch having alternative first and second positions, said first switch coupled to said reversible motor and to said first control means;
      (b) second control means coupled to said two most remote thermocouples and to said first switch;
      (c) said first switch in its first position coupling said first control means to said reversible motor, said first switch in its second position coupling said second control means to said reversible motor;
      (d) said second control means including means responsive to said difference voltages for causing said motor to move said thermocouples toward a selected one of said remote thermocouple locations.

4. Apparatus as claimed in claim 3 in which said thermowell is in thermal communication with a fixed bed catalytic reactor.

5. Apparatus as claimed in claim 1 further including electrical circuit means for providing an electrical signal indicative of the extent of insertion of said thermocouple sheath within said thermowell.

6. Apparatus as claimed in claim 1 in which said thermowell is in thermal communication with a fixed bed catalytic reactor.

7. Temperature measuring apparatus comprising:
   an elongated flexible thermocouple sheath;
   first, second and third thermocouples within said sheath, said thermocouples being colinear and substantially equally spaced apart, each of said thermocouples producing a voltage indicative of the temperature at its location;
   means connecting the two most remote of said thermocouples in voltage opposition to produce a difference voltage indicative of the temperature difference between said two remote thermocouple locations;

a thermowell for receiving said sheath;

motor drive means coupled to said sheath outside said thermowell for controlling insertion of said sheath into said thermowell and removal of said sheath from said thermowell, said motor drive means including a reversible motor for operation in a first direction in which said sheath is retracted from said thermowell and in a second direction in which said sheath is inserted into said thermowell;

sheath storage means for coilably holding said sheath upon removal of said sheath from said thermowell;

input power means; and control means coupled to said input power means, to said motor drive means, and to said two most remote thermocouples, said control means responsive to said difference voltage for causing said motor to move said thermocouples toward a selected one of said remote thermocouple locations.

8. Apparatus as claimed in claim 7 in which said thermowell is in thermal communication with a fixed bed catalytic reactor.

References Cited
UNITED STATES PATENTS

| | | | |
|---|---|---|---|
| 2,368,937 | 2/1945 | McGillin et al. | 136—233X |
| 2,718,538 | 9/1955 | Wyatt | 136—234X |
| 2,796,455 | 6/1957 | Jones | 136—232X |
| 2,820,839 | 1/1958 | Schunke | 136—231 |
| 2,971,041 | 2/1961 | France | 136—234 |
| 3,393,101 | 7/1968 | Kirkpatrick | 136—231X |

CARL D. QUARFORTH, Primary Examiner

H. E. BEHREND, Assistant Examiner

U.S. Cl. X.R.

136—230, 232, 242